(12) United States Patent
Ridder et al.

(10) Patent No.: US 6,289,528 B1
(45) Date of Patent: Sep. 18, 2001

(54) MAT IN THE FORM OF A LINER OR PAD FOR SANITARY FACILITIES AND METHOD OF PRODUCING THE MAT BY INJECTION MOLDING

(75) Inventors: Jurgen Ridder, Nassau; Johannes Hubinger, Staudt, both of (DE)

(73) Assignee: Ridder GmbH, Nassau/Lahn (DE)

( * ) Notice: Subject to any disclaimer, the term of this patent is extended or adjusted under 35 U.S.C. 154(b) by 198 days.

(21) Appl. No.: 08/911,913

(22) Filed: Aug. 15, 1997

(30) Foreign Application Priority Data

Aug. 20, 1996 (DE) .............................. 296 14 317

(51) Int. Cl.$^7$ ...................................... A47K 3/02
(52) U.S. Cl. ...................................... 4/583; 4/581
(58) Field of Search .............................. 4/580, 581, 582, 4/583

(56) References Cited

FOREIGN PATENT DOCUMENTS

| 24 14 294 | 10/1975 | (DE) . | |
| 77 21 240 | 12/1977 | (DE) . | |
| 30 28 661 | 2/1982 | (DE) . | |
| 3303993 | * 8/1984 | (DE) | ......... 4/581 |
| 2190404 | * 11/1987 | (GB) | ......... 4/581 |

OTHER PUBLICATIONS

Harper, Ed., Handbook of Plastics, Elastomers, and Composites (2d. Ed. 1992) pp. 7.1, 7.2 and 7.37 to 7.41 (Handbook).*

* cited by examiner

Primary Examiner—Robert M. Fetsuga
(74) Attorney, Agent, or Firm—Nixon Peabody LLP; David S. Safran

(57) ABSTRACT

A Mat (1) in the form of a liner or pad for sanitary installations is formed of a carrier (3) of flexible plastic with suction cups (5) located on its bottom (4) and a layer of nonwoven fabric (2) on its top (1.1) is constructed to enable the mat (1) to be efficiently produced and for the mat to have good adhesion between the nonwoven fabric (2) and the carrier (3) even when experiencing high squeezing stress. This is achieved by making the carrier (3) of a thermoplastic elastomer (TPE) injecting the elastomer onto the back of nonwoven fabric (2) in an injection mold.

4 Claims, 1 Drawing Sheet

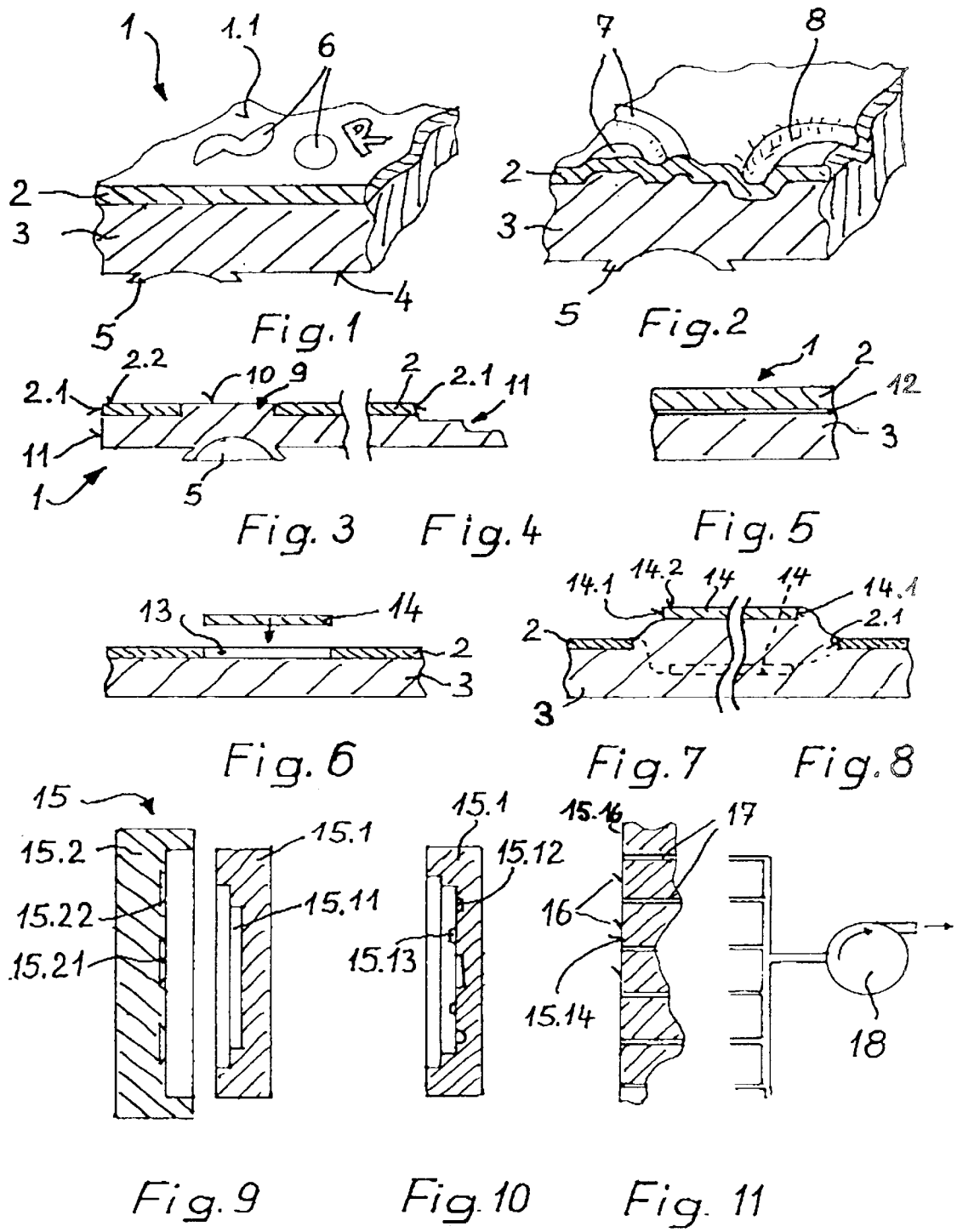

MAT IN THE FORM OF A LINER OR PAD FOR SANITARY FACILITIES AND METHOD OF PRODUCING THE MAT BY INJECTION MOLDING

BACKGROUND OF THE INVENTION

1. Field of the Invention

The invention relates to a mat in the form of a liner or pad for sanitary facilities, such as bathtubs, shower stalls, washstands, or the like. In particular, the invention relates to such mats as are made of a carrier of flexible plastic with suction cups on its bottom and a layer of nonwoven fabric on its top. Additionally, the invention also relates to an injection mold comprised of at least two mold parts which can be moved towards and away from one another for producing such a mat.

2. Description of Related Art

A mat of the type to which the present invention is directed is known from German Patent Application DE 3028661 A1. This mat has a lattice-like carrier to which suction cups are attached on one side. On the side of the carrier opposite the suction cups, a layer of textile material, for example, a nonwoven fabric, is attached. As a result of the lattice-like nature of the carrier, there are openings which are covered by nonwoven fabric, but which enable easy, rapid sinking, for example, in a filled bath, as a result of the permeability of the nonwoven fabric. The openings are therefore covered by a layer to make the mat kind to the skin.

A mat with a network-like carrier is also known from German Patent Application DE 241294 A2. The network-like carrier of this mat is jacketed with a foamed plastic such that the openings remain open. This is intended to avoid subsequent production of openings and thus enable efficient manufacture.

Finally, German Utility Model DE-GM 7721240 discloses a mat with a rubbing or cleaning coating on its carrier in the form of flexible pegs or bristles. Thus, for example, cleaning or massaging of the back when showering or bathing will be enabled, the mat being attached by means of molded suction cups to the bathtub or the wall of the shower stall.

SUMMARY OF THE INVENTION

A primary object of this invention is to be able to efficiently produce a mat of the initially mentioned type.

In conjunction with foregoing object, it is a further object of the invention to, at the same time, obtain good adhesion between the nonwoven fabric and carrier to an extent which will be permanently ensured even under high squeezing stress.

These objects are achieved in accordance with embodiments of the invention by forming the carrier of a thermoplastic elastomer (TPE) which has been back-injected onto a nonwoven fabric.

With the invention, the nonwoven fabric has such a high wear resistance that the carrier will tear before the nonwoven fabric will come loose from the carrier. This is due to the fact that the nonwoven fabric is covered over a very large surface by thermoplastic elastomer material. The elastic penetrates deep into the nonwoven fabric, but not through it, so that the anti-slip property of the nonwoven fabric is essentially preserved. Nor does the nonwoven fabric lose the ability to prevent formation of water puddles on its surface.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIGS. 1 and 2 each show a perspective view of section through a piece of a mat in accordance with the present invention;

FIGS. 3 through 8 each show a cross section through a mat segment of a respective different embodiment of the mat in accordance with the present invention;

FIG. 9 is a schematic representation of one advantageous two-part injection mold for producing the mat of the invention;

FIG. 10 shows a mold with a special design of the shaping surface for the nonwoven fabric for forming elevations and/or depressions; and FIG. 11 shows a mold with retaining elements for the nonwoven fabric to be inserted.

DETAILED DESCRIPTION OF THE PREFERRED EMBODIMENTS

FIG. 1 shows a section of a mat 1 which is formed of a nonwoven fabric 2 which having an exposed surface 1.1 to which a carrier 3 of thermoplastic elastomer (TIE) has been back-injected. Suction cups 5 are molded onto the bottom 4 of the carrier 3, so that they form a homogenous structural unit with the carrier 3.

Nonwoven fabric 2 can be made colorless, monocolored or multicolored. Nonwoven fabric 2 can also be imprinted with one or more decorations 6, one or more patterns, one or more graphics, or the like.

In the embodiment shown in FIG. 2, the nonwoven fabric 2 is plastically deformed so that elevations 7 and depressions 8 result at the top and bottom sides thereof. This is done during application of the carrier 3 to the fabric 2 as described more fully below.

According to one advantageous embodiment of the invention, shown in FIG. 3, the nonwoven fabric 2 has at least one opening 9 that is filled with the material of carrier 3. In this way, the surface 10 of mat 1, preferably, acquires better anti-slip properties than when using nonwoven fabric 2 alone. In this embodiment, the nonwoven fabric 2 terminates at the outside edge 11 of the mat 1, so that face 2.1 of edge 2.2 of nonwoven fabric 2 is exposed and is aligned with the outside edge 11.

However, the nonwoven fabric 2 can also be smaller than the mat dimensions, so that the outside edge 11 of mat 1 is only partially covered by the nonwoven fabric 2. The outside edge 11 can also be made staggered or stepped to the inside and outside, as shown in FIG. 4.

In one advantageous aspect of the invention, a nonwoven fabric 2 can be used which, as is conventional, is provided on its underside with a heat-sealable layer 12, as is illustrated in FIG. 5. The material of heat-sealable layer 12, preferably, has a melting point which is in the range of the melting point of the carrier material and which is preferably lower than it.

Advantageously, a nonwoven fabric 2 is used which is comprised of a hot-bonded or hot-bondable material and/or which contains this material, for example, in the form of a coating or impregnation. Thus, on the one hand, the stability of the surface shape of the nonwoven fabric 2 is guaranteed, and on the other hand, dimensionally-stable production of elevations 7 and/or depressions 8 during the injection molding process in the manufacture of carrier 3 is enabled.

Another development of the invention calls for providing the nonwoven fabric 2 with a cutout 13 into which at least one pattern 14 is inserted as represented in FIG. 6. The shape of cutout 13 and/or inserted pattern(s) 14 can have different geometries or figures. Pattern(s) 14 can completely or only partially fill cutout 13 and thus may or may not touch nonwoven fabric 2.

Pattern(s) 14 can be made of any material; but, preferably, a nonwoven fabric is likewise used. This nonwoven fabric can have the same or different properties as nonwoven fabric 2. Thus, the inserted nonwoven fabric can have a different color, different decoration and/or different graphics and/or different thickness and/or different density or the like relative to the nonwoven fabric 2.

According to the embodiments shown in FIGS. 7 & 8, the pattern 14 can be made or located elevated and/or depressed (represented by broken lines). In this case, the face 14.1 of edge 14.2 of pattern 14 need not be surrounded by the material of carrier 3, as FIG. 7 shows. On the other hand, the face 14.1 can also be covered by this material (FIG. 8) or the material can project over edge 14.1.

The thickness of nonwoven fabric 2 and/or pattern 14 is roughly 0.1 mm to 1 mm, especially 0.2 mm to 0.6 mm.

FIG. 9 shows a two-part injection mold 15 for producing mat 1. In first mold part 15.1, there is depression 15.11 of the size of nonwoven fabric 2 to be inserted into the mold part 15.1.

In the second mold part 15.2, there are peripherally undercut depressions 15.21, 15.22 in which suction cups 5 are formed in the injection molding process.

Mold part 15.1 has, preferably, within depression 15.11, other depressions 15.12 and/or projections 15.13 which form the shape of elevations 7 or depression 8 of nonwoven fabric 2 as shown in FIG. 10.

So that nonwoven fabric 2 maintains its position when inserted into mold part 15.1, especially in a vertical arrangement of injection mold 15, as shown, the inner surface 15.4 of the mold part has, at least on upper edge 15.16, retaining elements 16. For example, the retaining elements 16 can ben knin the form of pins and/or hooks and/or teeth or the like. Retaining elements 16 can also be distributed over a major portion of surface 15.14 or over the entire surface 15.14.

Retaining elements 16, when the nonwoven fabric 2 is inserted in to the mold, fit into or penetrate it, and thus, fix the fabric 2 in the position necessary for the injection molding process. The length or projecting height of retaining elements 16 can be chosen to be larger than the thickness of the nonwoven fabric 2 so that they can penetrate through it. The ends projecting on the other side are then molded into the material of carrier 3.

In addition to or instead of retaining elements 16 and/or the depression 15.11, the mold can be provided with suction openings 17, for example, in the form of holes or passages, in at least one of mold part 15.1 and/or 15.2, which are connected to a suction device 18, for example, a vacuum pump, so that the negative pressure holds or assists in holding the nonwoven fabric 2 in position when a vacuum or negative pressure is applied by suction device 18.

While various embodiments in accordance with the present invention have been shown and described, it is understood that the invention is not limted thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. A mat for sanitary facilities comprising a carrier of flexible plastic with suction cups on a bottom side thereof and a layer of nonwoven fabric on a top side of the carrier; wherein the carrier is formed of a thermoplastic elastomer and is joined to the nonwoven fabric by having been back-injected onto the nonwoven fabric; wherein the suction cups and carrier are formed of a homogenous one-piece structural unit.

2. Mat as claimed in claim 1, wherein the nonwoven fabric has at least a decorative imprint.

3. Mat as claimed in claim 1, wherein the nonwoven fabric has a thickness of about 0.1 mm to 1 mm.

4. Mat for sanitary facilities comprising a carrier of flexible plastic with suction cups on a bottom side thereof and a layer of nonwoven fabric on a top side of the carrier; wherein the carrier is formed of a thermoplastic elastomer and is joined to the nonwoven fabric by having been back-injected onto the nonwoven fabric; wherein the nonwoven fabric has a thickness of about 0.2 mm to 0.6 mm.

* * * * *